Dec. 16, 1969  F. BURKE  3,484,006
WASTE DISPOSAL VEHICLE
Filed Nov. 24, 1967  4 Sheets-Sheet 1

United States Patent Office 3,484,006
Patented Dec. 16, 1969

3,484,006
WASTE DISPOSAL VEHICLE
Frederick Burke, Flore, England, assignor to Hipope Limited, Northampton, England, a British company
Filed Nov. 24, 1967, Ser. No. 685,415
Claims priority, application Great Britain, Dec. 7, 1966, 54,754/66
Int. Cl. B65f 3/06
U.S. Cl. 214—303                                   1 Claim

ABSTRACT OF THE DISCLOSURE

A waste or garbage collection vehicle has a rear loading carrier which is coupled to a parallelelogram linkage at each side of the vehicle and these linkages are power-operated to lift the carrier with a parallel motion to a tipping position, and then to tilt the carrier to discharge its contents into the vehicle.

---

The subject of this invention is a waste collection and disposal vehicle having a novel form of charging gear and other advantageous features.

Basically it comprises a wheeled-chassis with a waste container mounted thereon, and equipment for loading waste into said container, this equipment comprising a charging carrier and power-operated linkages coupled, or adapted to be coupled, to said carrier and operable to lift the latter in a paralell motion from a low loading position to the level of a charging opening in said container and then to tip the carrier to discharge the contents thereof into the container.

In use, waste to be disposed in the container is placed in the carrier with the latter in its low loading position, whereafter the carrier is raised by the power-operated linkages, until it is brought to the level of the charging opening, whereupon the linkages are deformed to cause the carrier to tilt and so pour the waste down through the opening into the waste container. The arrangement is so contrived that, during the upward movement of the charging equipment to tipping level it will remain untilted, thus avoiding any hazard of the contents being spilled, and making smaller demands on available maneuvering space at the rear of the vehicle.

In a preferred form, each of the power-operated linkages is constituted by a parallelogram which is provided with pivotal joints at the corners and can be contracted to produce a parallel lifting motion of the carrier and expanded to produce a parallel lowering motion of the same, and which includes one arm which can be extended to produce the tipping of the carrier.

Figure 1:
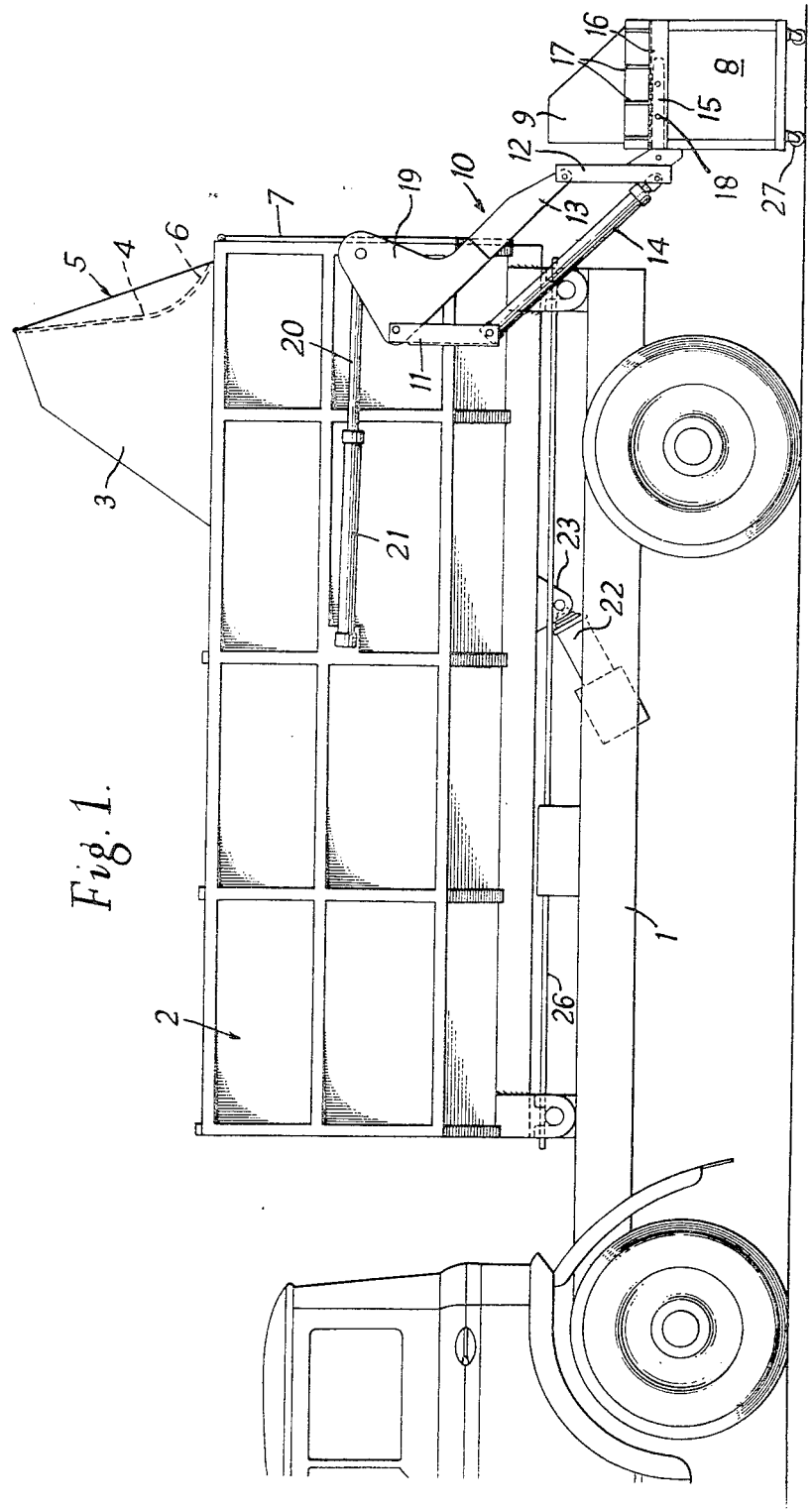
Figure 2:
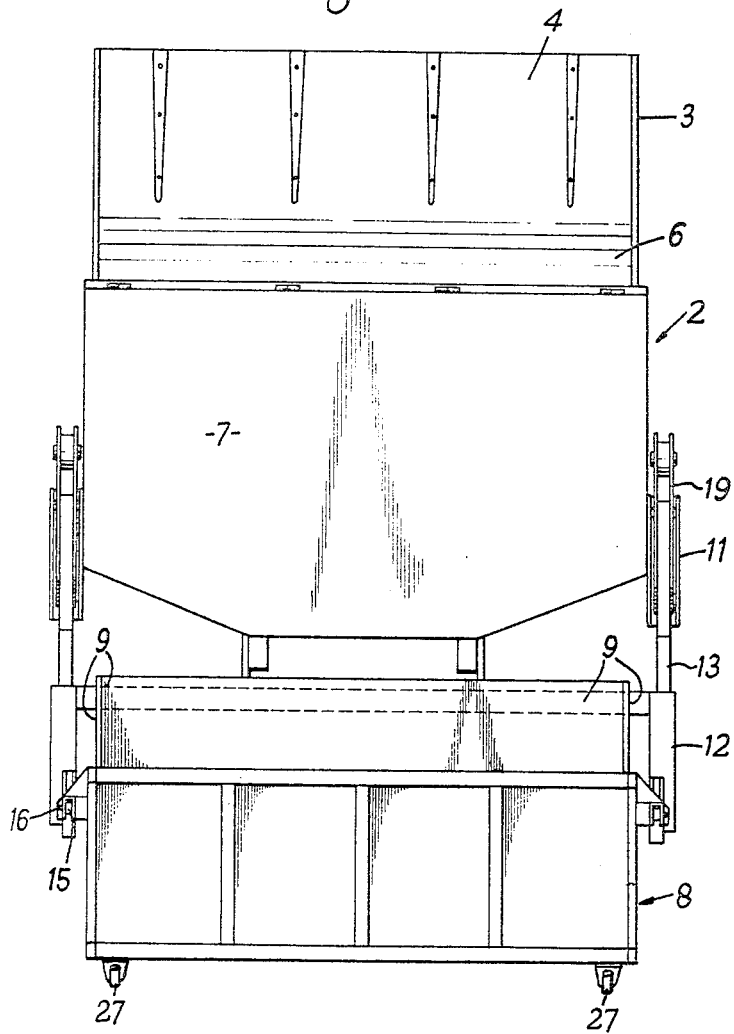
Figure 3:
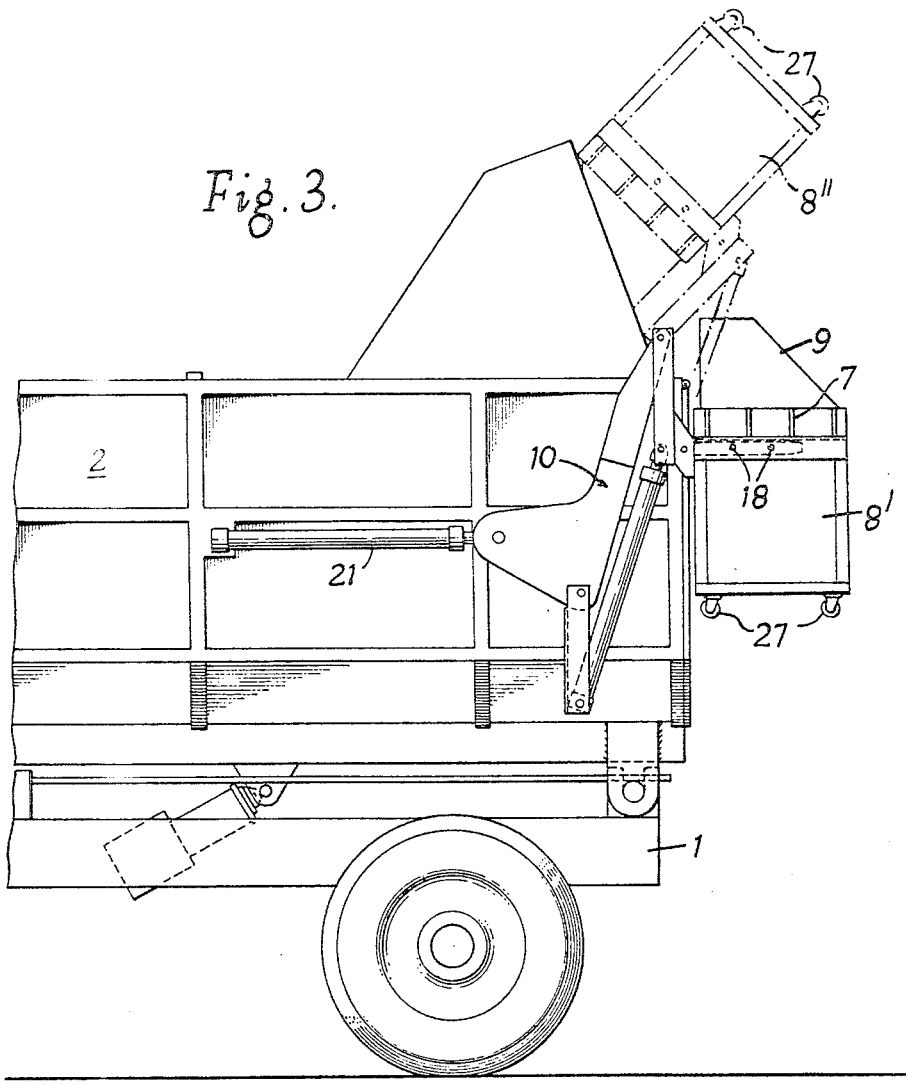
Figure 4:
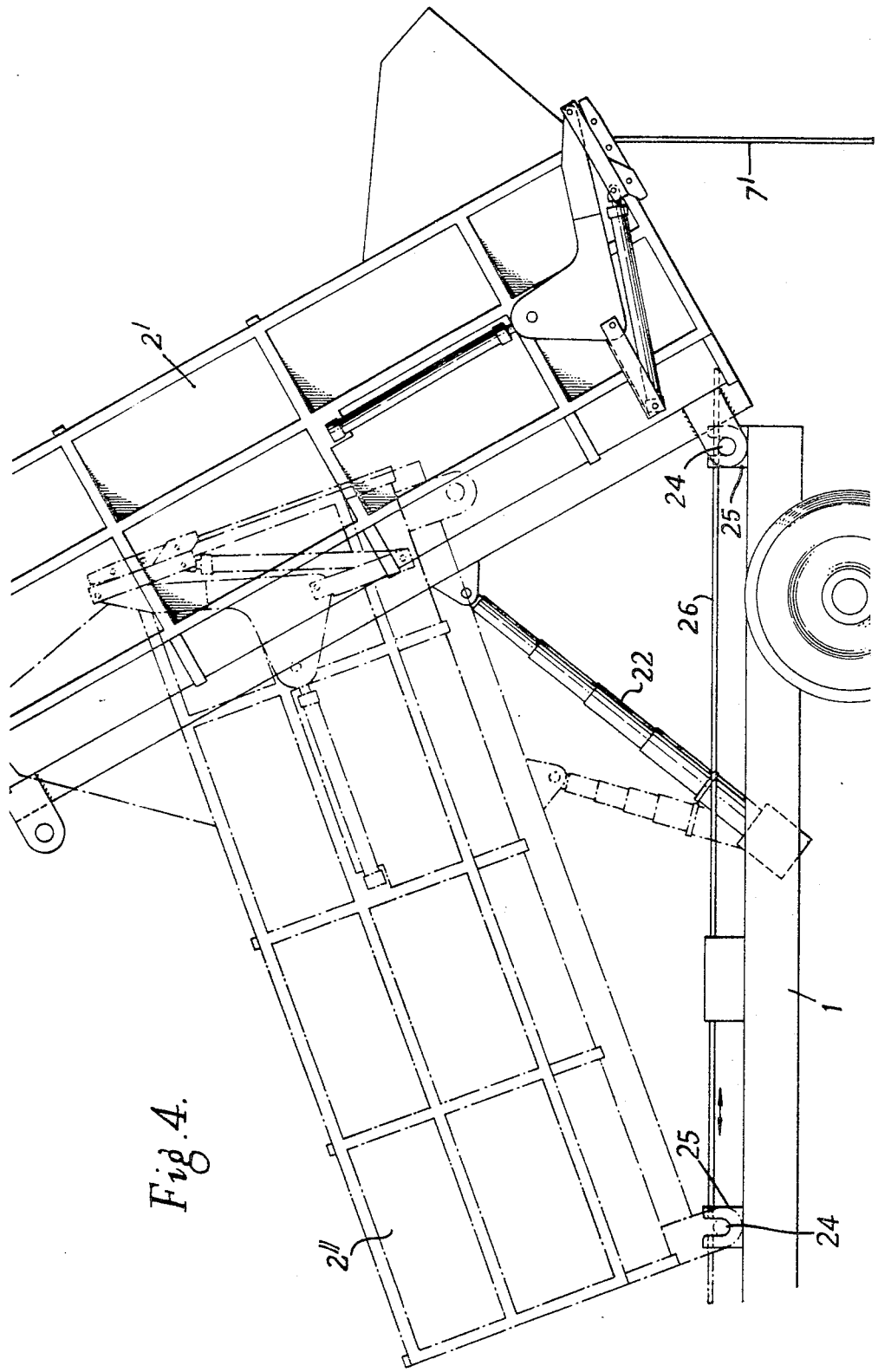

A waste collecting and disposal truck constructed in accordance with this invention is illustrated in the accompanying drawings, in which:

FIGURE 1 is a side view of the complete vehicle, with the loading equipment in its lowered position, FIGURE 2 is a view taken from the rear end of the vehicle, seen in FIGURE 1, FIGURE 3 is a side view of the rear end part of the vehicle, sowing the loading equipment in two of the positions it assumes during a charging operation, and FIGURE 4 is a side view of the complete truck indicating alternative possible tipping of the main container body.

The truck illustrated is equipped with a normal dirver's cab and a wheeled chassis designated 1. This chassis serves to mount a main waste container body, designated 2, this being hollow and having a top which is closed except for a charging opening at the rear.

This opening is defined by an upstanding hood 3 with a rearwardly-facing mouth 5. A weatherproofing closure flap 4 of stout polyethylene, or other suitable material is hinged to the upper edge of mouth 5. The flap 4 has a curved, rearwardly-projecting lip 6 cooperating with the rear edge of mouth 5, whereby the flap will completely close this mouth when it hangs downwards, in the normal way, under gravity. It thus constitutes a barrier to the egress of dust from the charged container when, for example, the vehicle is in motion.

The container body 2 is provided with a rigid rear end closure wall 7 which is hinged to the body at its upper edge and is normally held closed against the body by fastening means (not shown) at its lower edge. This rear wall 7 forms a tailgate which, when the fastening means are undone, can be swung out for dumping the contents of the waste container.

The carrier used in this particular instance comprises an open-topped box 8 with castors 27. This box 8 may receive loose waste or individual waste containers, e.g. lidless dustbins may be placed therein.

Carrier 8 is also provided, it will be noted, with upstanding cheeks 9 which constitute a shallow, three-sided pouring chute.

The raising and tipping of the carrier 8 is catered for by the use of two hydraulically-operated parallelogram linkages generally denoted 10, one at each side of the vehicle. Each such linkage comprises a fixed vertical arm 11 secured to the body of container 2, an opposite and similar, but movable arm 12, a further arm in the form of a link 13 pivotally coupling the upper ends of the arms 11 and 12, and a fourth arm 14 comprising a first piston cylinder unit which, in its retracted condition, is of the same length as link 13. This is hinged to the lower ends of the arms 11 and 12 and is substantially parallel to link 13 when it is contracted.

The arm 12 of each linkage carries a robust finger 15 projecting rearwards from its lower part. This finger is adapted to be removably received in a channel piece 16 fixed to the corresponding side of box 8 and reinforced by webs 17. The fingers 15 are detachably secured in the channels 16 by means of removable bolts 18. Each link 13 is provided with a projection 19 to which is pivoted the rod 20 of a second piston cylinder unit 21 hinged to the side concerned of the container 2, the link 13 and its projection 19 constituting, in effect, a bellcrank lever.

As indicated above, the loading equipment is shown in FIGURE 1 in its lowered position, i.e. with piston rod 20 extended and box 8 in the position in which it is placed to receive waste which is to be loaded into container 2. To effect this loading, hydraulic pressure is applied to cylinder 21 to retract piston rod 20, this causing bellcrank lever 19 to pivot about its fulcrum on arm 11, so raising box 8.

By virtue of the parallel linkage the arm 12 moves inwards and upwards but will remain parallel to arm 11, so that box 8 will be translated upwards without tilting and without spillage of the contents. It is arranged that, when the piston rod 20 is fully retracted box 8 will have been moved to position 8', i.e. closed up against the tailgate 7 of the main container 2 with its open top substantially at the level of the top of container 2, i.e. level with the charging opening of the latter.

This is to be followed by a tipping of box 8 from the position shown at 8' in FIGURE 3 to that illustrated in dotted lines at 8", i.e. to discharge its contents under gravity into the main container. When this occurs the pouring chute 9 enters hood 3 and pushes back apron 4, so discouraging the discharge of dust or particles into the surrounding atmosphere.

The tipping is brought about by applying hydraulic fluid to piston cylinder unit 14 so as to cause projection of the piston rod thereof, and it will be appreciated that the supply of hydraulic fluid to units 21 and 14 can be effected in time sequence under the control of an operator in the driver's cab of the vehicle. If, after a loading operation, the main vehicle is to be driven to some other site, the unit 14 will be retracted to bring the loading equipment to the position illustrated at 8' in FIGURE 3, this being the normal travelling position of the equipment.

It will also be observed that the lorry is equipped with standard hydraulic means for tilting the container 2 as a whole, either forwards or backwards. Thus it will be observed that twin main piston cylinder units 22 are hinged to chassis 1 and engage with lugs 23 depending from the underside of the container. The latter is also provided at its front and rear ends with depending lugs carrying transverse rods 24 which journal in corresponding U-shaped brackets 25 on the chassis. A sliding rod 26 at each side of the chassis can be shifted longitudinally to close the front or the rear pair of brackets 25.

During the loading of container 2 it may be useful to shift the contents forwards. This can be accomplished by latching the front rod 24 and extending units 22 to bring the container into the forwardly-tilted position indicated in dotted line at 2", in FIGURE 4. When, however, the lorry is to be unloaded the rear rod 24 will be latched and front rod 24 unlatched and, on operation of units 22 the container body will fulcrum about rear rod 24 to the position shown in full line at 2' in FIGURE 4. If the tailgate has been unfastened it will swing into position 7' in the latter figure, and the waste will be dumped.

As indicated above, the parts of the vehicle described can be modified to suit particular requirements. Where, for example, it is to be used for, say dust removal, the carrier may be represented by a frame with a bottom support, e.g. in the form of a set of spaced fingers, for receiving dustbins. In this event, a clamping bar may be pivoted to the frame so that it can be brought down to hold the dustbins in position during the raising and tilting of the frame. This bar can be arranged either to co-operate with handles already provided on the dustbins, or, where the bins are without handles, the bar may be clipped to engage over the upper rims of the bins.

I claim:

1. In a collection and disposal vehicle having a wheeled chassis, a continer mounted on said chassis, and equipment for loading material into said container, said equipment comprising a charging carrier, and power-operated parallelogram linkages coupled to said carrier and operable to lift the latter in a parallel motion from a low loading position to an elevated charging position, the improvement comprising a first hydraulic piston-cylinder unit constituting one arm of each parallelogram linkage, said unit being extendible to produce tipping of the carrier in the elevated charging position thereof, and a second hydraulic piston-cylinder unit coupled to the arm of the parallelogram opposite the extendible arm for turning said opposite arm about a fixed fulcrum to contract the parallelogram linkage to produce a parallel lifting motion of the carrier and to expand said linkage to produce a parallel lowering motion of the carrier.

References Cited

UNITED STATES PATENTS

| | | | |
|---|---|---|---|
| 822,265 | 6/1906 | Friese | 214—303 |
| 3,127,039 | 3/1964 | Christiansen | 214—313 |
| 3,195,248 | 7/1965 | Martin | 214—775 X |
| 3,286,860 | 11/1966 | Naab | 214—303 |

HUGO O. SCHULZ, Primary Examiner